Figure 1:
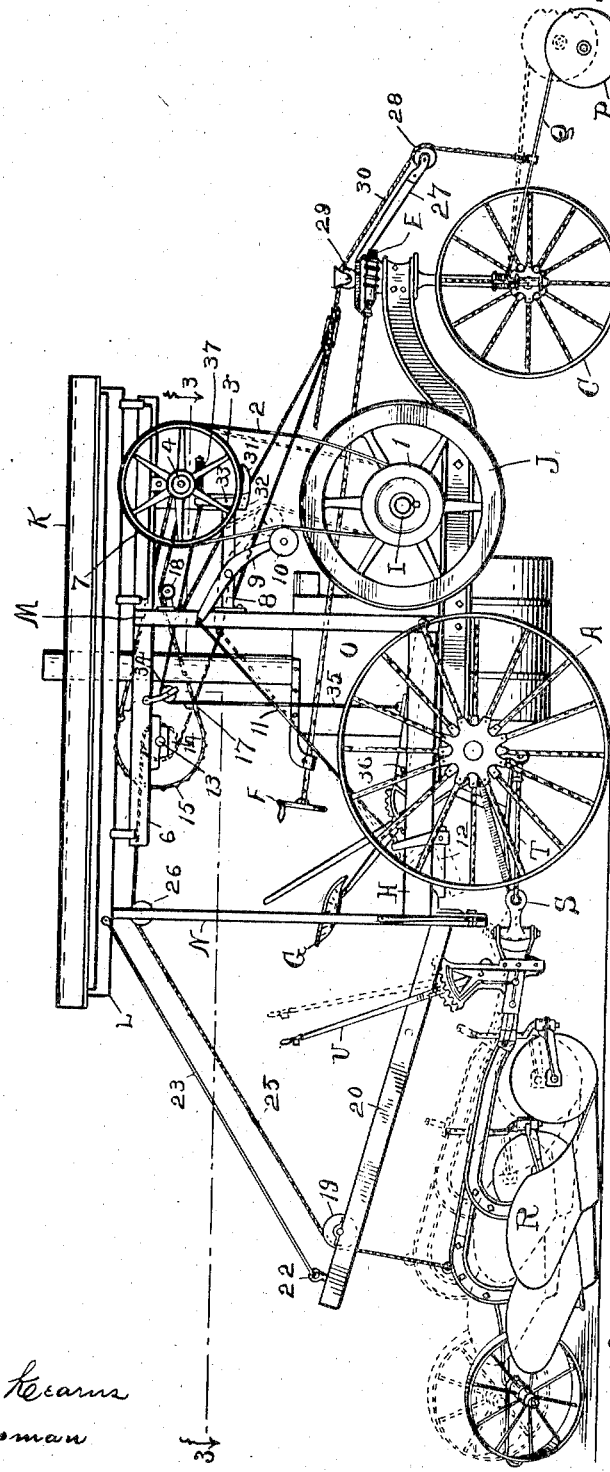

O. F. KIMMEL.
LIFTING DEVICE OR HOIST.
APPLICATION FILED SEPT. 19, 1916.
1,290,232.
Patented Jan. 7, 1919.
2 SHEETS—SHEET 2.
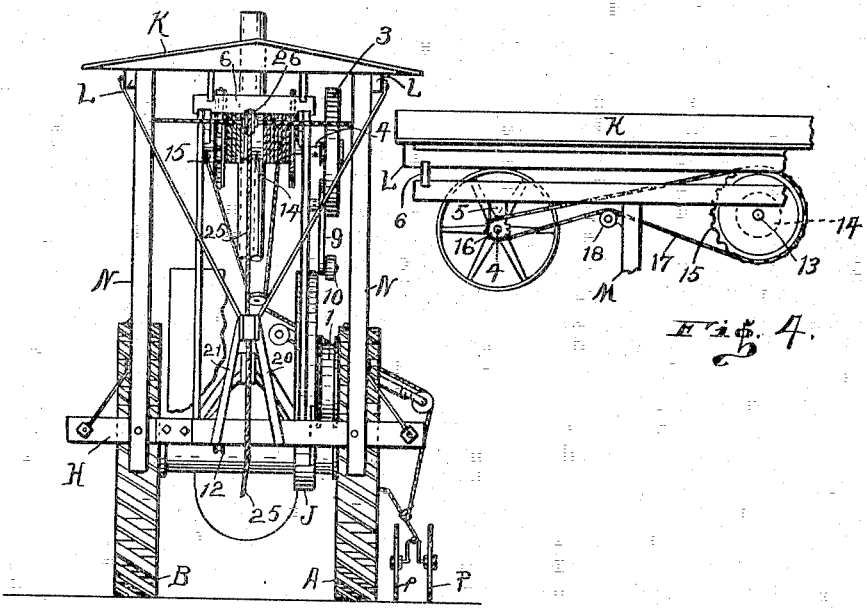
Fig. 2.
Fig. 4.
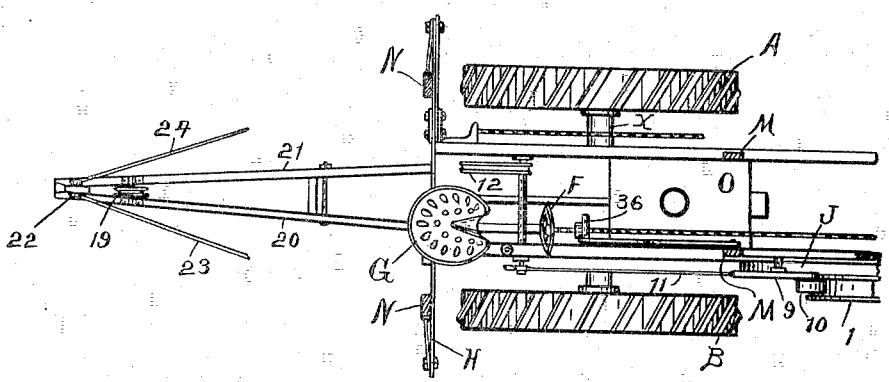
Fig. 3.
Adelaide Kearns
Draftsman.
Inventor:
Ozro F. Kimmel
By Robert W. Caudle
Attorney.

UNITED STATES PATENT OFFICE.

OZRO F. KIMMEL, OF NEAR ELDORADO, OHIO, ASSIGNOR OF TWO-THIRDS TO EDWARD HARRIS, OF EBENEZER, OHIO, AND WALLACE TEEGARDEN, OF RICHMOND, INDIANA.

LIFTING DEVICE OR HOIST.

1,290,232.      Specification of Letters Patent.      Patented Jan. 7, 1919.

Application filed September 19, 1916. Serial No. 120,950.

*To all whom it may concern:*

Be it known that I, OZRO F. KIMMEL, a citizen of the United States, residing near Eldorado, in the county of Preble, in the State of Ohio, have invented a new and useful Construction in Lifting Devices or Hoists, of which the following is a true and accurate specification and exposition, being such as will enable others to make and use the same with exactitude.

The object of my invention, broadly stated, is to provide a lifting device for use in connection with traction engines or the like, which will be strong and durable in construction, easily operated and controlled, comparatively light in weight, positive in action, simple in its various parts, which will not interfere with the regular work of the engine or with the operator thereof, and which can be manufactured and sold and installed at a comparatively low price.

More specifically stated, my object is to provide a lifting device adapted to be connected with or to form a part of a traction engine or the like without material change in the construction or the arrangement of the engine parts, and adapted to raise and lower the tools, such for instance as a gang of plows, which may be trailing the engine and operated thereby, and having means whereby the power required to raise or lower said tools will be provided by the engine and to be controlled at the will of the operator of the engine.

Other minor objects and particular advantages of the invention will suggest themselves in the course of the following description, and that which is new will be correlated in the appended claim.

The preferred means for carrying out the objects of my invention in a practical, economical, and efficient manner is shown most clearly in the accompanying drawings, forming a part of this specification, in which—Figure 1 is a side elevation of a traction engine with which my invention is connected. Fig. 2 is a rear end elevation of the engine and showing certain parts of the invention, Fig. 3 is a section of a portion of the parts, as taken on the line 3—3 of Fig. 1. Fig. 4 is a detail elevation of one portion of the invention, showing the side opposite to that shown in Fig. 1.

Similar indices denote like parts throughout the several views.

In order that the construction, the operation, and the advantages of the invention may be more fully understood and appreciated, I will now take up a detailed description thereof, in which I will set forth the invention as briefly and as comprehensively as I may.

The main features of a traction engine which are shown herein merely to make clear the adaptation of my invention thereto, comprise the ground wheels A and B, which are mounted on the axle X, and the front or steering wheel C, the main frame D being mounted on the axle X and carried by said wheels. The wheel C is pivotedly mounted and is adapted to be controlled by the worm-gear E, the latter being controlled by the hand wheel F which is located near the driver's seat G. The said seat is carried by the sub-frame H which is carried by the frame D but it extends only a short distance forward thereon while it projects some distance to the rear thereof.

Letter I denotes the power shaft of the motor O which is mounted on the frame D and to which the wheels A and B are also connected in the usual manner immaterial to this invention.

Letter J denotes the fly-wheel which is secured on the shaft I.

Letter K denotes the roof, which is carried by the top-frame L, being supported by the front posts M and the rear posts N which extend up from the sub-frame H.

Letter P denotes the steering disks, or guiding device, which are connected to the frame of the ground wheel C by the hinged arm Q, and it is adapted to be propelled along in front of the machine or engine.

Letter R designates a gang of plows which are pivoted at S to the draw-bar T whereby they will be drawn by the rear-axle or some other part of the engine. Letter U denotes a lever for adjusting or tilting the gang of plows, or other tools.

My invention proper comprises the drive-pulley 1 which is secured on the drive shaft I and on which operates the belt 2. The said belt passes up around the driven pulley 3, the latter being secured on the secondary shaft 4. The shaft 4 is carried by suitable hangers 5 which extend down from the auxiliary frame 6, which latter is secured to the top frame L.

Extending down from the frame 6, and located near the right-hand hanger 5, is the vertical arm 7 whose lower end is united with the forward end of the horizontal arm 8, the latter being connected to the right-hand post M.

Pivoted near its center to the arm 8 is the swinging lever 9 on the lower end of which is mounted the idle pulley 10 which is adapted to contact with the belt 2 and tension it with the pulleys 1 and 3, for the purpose hereinafter explained.

Attached to the upper or rear end of the lever 9 is a cord or chain 11 which extends down to the foot pedal 12 in such manner that by pressing the pedal 12 the pulley 10 will be pressed against the belt whereby the belt will be tightened, as stated, to cause the shaft 4 to revolve with but at a lower rate of speed than that of the shaft I.

Numeral 13 denotes a shaft mounted to revolve in suitable bearings extending down from the sides of the frame 6. Secured around on the shaft 13 is the drum 14 which has a flange on its right-hand end and constructed with the large sprocket wheel 15 on its left-hand end, the latter also being secured on the shaft 13. Secured on the shaft 4 is the small sprocket 16 which is in line with the sprocket 15. Connecting the sprockets 15 and 16 is the sprocket chain 17. An adjustable idler 18 is attached to the left post M whereby the chain 17 may be tightened when so required.

The derrick or mast comprises the two members 20 and 21 which are spaced apart at their inner ends where they are secured to the rear end of the frame H and from which they extend convergently rearward and slightly upward over the plows R at substantially the angle shown in Fig. 1. Near the rear ends of the members 20 and 21 there is a sheave 19 which is rotatably mounted between said members. Secured between the rear ends of the members 20 and 21 is the eye-piece 22 in which is secured the rear ends of the braces or supports 23 and 24 which extend divergently upward and forward where they are secured to the sides of the frame L, and they support the derrick in a position slightly upward from horizontal position.

Numeral 25 denotes a cable which is secured to the central portion of the gang of plows R, from which it extends upward over the sheave 19, then over the sheave 26, the latter being carried by the post N, and then extending directly to the drum 14, around which it is adapted to be wound.

Extending forward and to the right from the stem of the wheel C, and from above the worm E, is the arm 27 which has on its forward end the sheave 28. Carried over the upper central portion of the stem of the wheel C is the sheave 29.

Numeral 30 denotes a cable having one end thereof secured to the central portion of the arm Q, from which it extends up over the sheaves 28 and 29 and then to the drum 14 around which it is adapted to wind reversely to the cable 25.

Numeral 31 denotes the brake-shoe which is located at the underside of the pulley 3 and is adapted to contact with the periphery thereof. The shoe 31 is carried by the arm 32 which is pivoted at 33. Extending back from the upper end of the arm 32 over the sheave 34 is the cable 35 which projects down and is secured to the central portion of the foot pedal 36, the forward end of said pedal being pivoted to the post M, or otherwise as desired. The upper end of the arm 32 is normally retained forward to its limit by the coil spring 37, thereby holding the brake-shoe out of contact with the pulley 3.

The operation of my invention is very simple, it being understood that the traction engine is to be operated and controlled in the usual manner by the driver located on the seat G.

Desiring now to place the plows and the steering device out of use, either for the purpose of conveyance from place to place, for turning a corner at the end of a land, or for the purpose of backing the engine, or for other reasons, then the driver has only to press on the pedal 12, thereby pressing the pulley 10 into contact with the belt 2 sufficient to tighten said belt, which will eventuate in revolving the wheel 3 thereby causing the drum 14 to revolve, which will wind the cables 25 and 30 thereon until the plows G and the steering device P are raised to the height desired, for instance to that as indicated by the dotted lines in Fig. 1. Simultaneous with releasing the pedal 12 the operator should press the pedal 36, which will cause the brake 31 to grasp the wheel 3 and thereby hold the plows and the steering device in suspension until it is desired to lower them at which time the pedal may be gradually released thereby allowing the cables to unwind from the drum 14 and permitting the plows and the steering device to assume the operative positions by gravity.

It is to be understood that the steering device P and my mechanism for their control may be entirely dispensed with, in which event my invention would apply only to the means for raising the plows.

It is also to be understood that other tools or devices may be substituted for the gang of plows R, in which event the operation of my invention would be practically the same as that as explained.

It is also to be understood that my invention is not to be limited to the particular type of traction engine shown herein, or to the precise arrangement of parts; and it is also to be understood that various changes may be made in the several details of construction without departing from the spirit of my invention and without sacrificing any of the advantages thereof.

Having now fully shown and described my invention, what I claim and desire to secure by Letters Patent of the United States, is—

A lifting device or hoist comprising in combination, a main frame, an auxiliary frame extending upwardly from the main frame, a permanently located derrick comprising two members spaced apart at their forward lower ends where they are rigidly secured to the rear end of the main frame and then extending rearward and upward convergently, a sheave mounted between the upper rear ends of the members of the derrick, a pair of suspension braces extending upwardly, forwardly, and divergently from the rear portions of said members of the derrick to the upper portion of the auxiliary frame for suspending the rear portion of the derrick, a second sheave carried by the auxiliary frame, a cable adapted to be attached to a load, located in the rear of the main frame, from which it extends upwardly over the first mentioned sheave and then forward over the second mentioned sheave, a drum revolubly mounted in the upper portion of the auxiliary frame, the forward end of said cable being attached to said drum whereby the cable may be wound thereon, means whereby said drum may be revolved by the power of an engine carried by the main frame, means whereby said cable may be manually controlled by a person carried on the main frame, a second cable adapted to be wound on said drum, and means for controlling the second cable to raise and lower an element located forward of the main frame, all substantially as shown and described.

In testimony whereof I have hereunto subscribed my name to this specification in the presence of three subscribing witnesses.

OZRO F. KIMMEL.

Witnesses:
EDDIE L. KIMMEL,
EVIN KIMMEL,
ROBT. W. RANDLE.

Copies of this patent may be obtained for five cents each, by addressing the "Commissioner of Patents, Washington, D. C."